United States Patent
Martinez et al.

(10) Patent No.: US 11,086,998 B2
(45) Date of Patent: Aug. 10, 2021

(54) MODIFIABLE POLICY ACTION SECURE BOOT VIOLATION SYSTEM

(71) Applicant: Dell Products L.P., Round Rock, TX (US)

(72) Inventors: Ricardo L. Martinez, Leander, TX (US); David Konetski, Austin, TX (US); Joseph Kozlowski, Hutto, TX (US); Carlton Andrews, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 15/883,910

(22) Filed: Jan. 30, 2018

(65) Prior Publication Data

US 2019/0236278 A1 Aug. 1, 2019

(51) Int. Cl.
*G06F 21/57* (2013.01)
*G06F 21/44* (2013.01)

(52) U.S. Cl.
CPC ............ *G06F 21/575* (2013.01); *G06F 21/44* (2013.01); *G06F 2221/034* (2013.01)

(58) Field of Classification Search
CPC .... G06F 21/575; G06F 21/544; G06F 21/572; G06F 2221/034
See application file for complete search history.

(56) References Cited

U.S. PATENT DOCUMENTS

| | | | | |
|---|---|---|---|---|
| 2010/0037323 A1* | 2/2010 | Lemieux | ............... | G06F 21/88 726/26 |
| 2014/0149730 A1* | 5/2014 | Joshi | ............... | G06F 21/572 713/2 |
| 2014/0304520 A1* | 10/2014 | Bobzin | ............... | G06F 21/572 713/187 |
| 2015/0089209 A1* | 3/2015 | Jacobs | ............... | G06F 21/572 713/1 |
| 2017/0230185 A1* | 8/2017 | Varadhan | ............... | H04L 9/14 |
| 2019/0065750 A1* | 2/2019 | Bolan | ............... | H04L 9/3234 |

* cited by examiner

*Primary Examiner* — Kevin Bechtel
*Assistant Examiner* — Hamid Talaminaei
(74) *Attorney, Agent, or Firm* — Haynes and Boone, LLP (57) ABSTRACT

A secure boot violation system includes a BIOS with an authenticated variables storage storing at least one authorization key and at least one signatures database. The BIOS receives a first policy action entry for association with a first signature in the at least one signatures database, determines that the first policy action entry is signed with the at least one authorization key and, in response, associates the first policy action entry with the first signature in the at least one signatures database. The BIOS then determines, during a boot process and subsequent to the associating the first policy action entry with the first signature, that a first secure boot violation has occurred based on the first signature in the at least one signatures database. In response to determining that the first secure boot violation has occurred, the BIOS performs a first policy action defined by the first policy action entry.

20 Claims, 5 Drawing Sheets

MODIFIABLE POLICY ACTION SECURE BOOT VIOLATION SYSTEM

BACKGROUND

The present disclosure relates generally to information handling systems, and more particularly to providing for the secure installation and modification of policy actions associated with secure boot violations in information handling systems As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, desktop computing devices, laptop/notebook computing devices, server computing devices, and/or other computing devices known in the art, include a Basic Input/Output System (BIOS) such as the Universally Extensible Firmware Interface (UEFI). The UEFI specification defines a conventional secure boot process that allows the BIOS to carry public Key Exchange Keys (KEKs) that are controlled by third party vendors and that provide for the allowance or disallowance of code from running as part of a boot process for the computing device. For example, a conventional BIOS may include an allowed code database (also known as the "signatures database" or "DB") that defines hash results or certificates associated with code that is allowed to run as part of the boot process, and a disallowed code database (also known as the "forbidden signatures database" or "DBX") that defines hash results or certificates associated with code that is not allowed to run as part of the boot process. As such, code that is signed with a certificate or that provides a hash result stored in the allowed code database will be allowed to execute during the boot process, while code that is not signed with a certificate or that provides a hash result that is not stored in the allowed code database will cause the computing device to halt operation. Similarly, code that is signed with a certificate or that provides a hash result that is stored in the disallowed code database will cause the computing device to halt operation as well.

Such conventional secure boot processes are limited in that secure boot violations (e.g., the attempted running of code that is not signed with a certificate or that provides a hash result that is not stored in the allowed code database, or code that is signed with a certificate or that provides a hash result that is stored in the disallowed code database) result in some static action that was defined by the vendor and is hard coded on the computing device outside the BIOS. The hard coding of such actions provides security (i.e., a third party is unable to modify the action performed in response to a secure boot violation), but prevents any granular control, severity identification, or other characteristics from being assigned to a secure boot violation. For example, most conventional secure boot processes provide binary responses to secure boot violations—either the computing device boots, or the booting and further operation of the computing device is halted, typically rendering the computing device unusable without user interaction or Information Technology (IT) remediation (e.g., a new operating system deployment.) Some secure boot processes may also provide an error message on subsequent reboots (following a secure boot violation), and possibly send out a log or alert associated with the secure boot violation, but those conventional actions are also hard coded on the computing device and unmodifiable, limiting the ability of end users or network administrators from tailor secure boot processes to their needs.

Accordingly, it would be desirable to provide an improved secure boot process.

SUMMARY

According to one embodiment, an Information Handling System (IHS) includes a chassis; a secured storage system that is housed in the chassis; a processing system that is housed in the chassis and that is coupled to the secured storage system; and a memory system that is housed in the chassis, that is coupled to the processing system, and that includes instructions that, when executed by the processing system, cause the processing system to provide a Basic Input/Output System (BIOS) that is configured to: receive a first policy action entry for association with a first signature in at least one signatures database provided in the secured storage system; determine that the first policy action entry is signed with at least one authorization key that is stored in the secured storage system and, in response, associate the first policy action entry with the first signature in the at least one signatures database provided in the secured storage system; determine, subsequent to the associating the first policy action entry with the first signature, that a first security violation has occurred based on the first signature in the at least one signatures database provided in the secured storage system; and perform, in response to determining that the first security violation has occurred, a first policy action defined by the first policy action entry.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
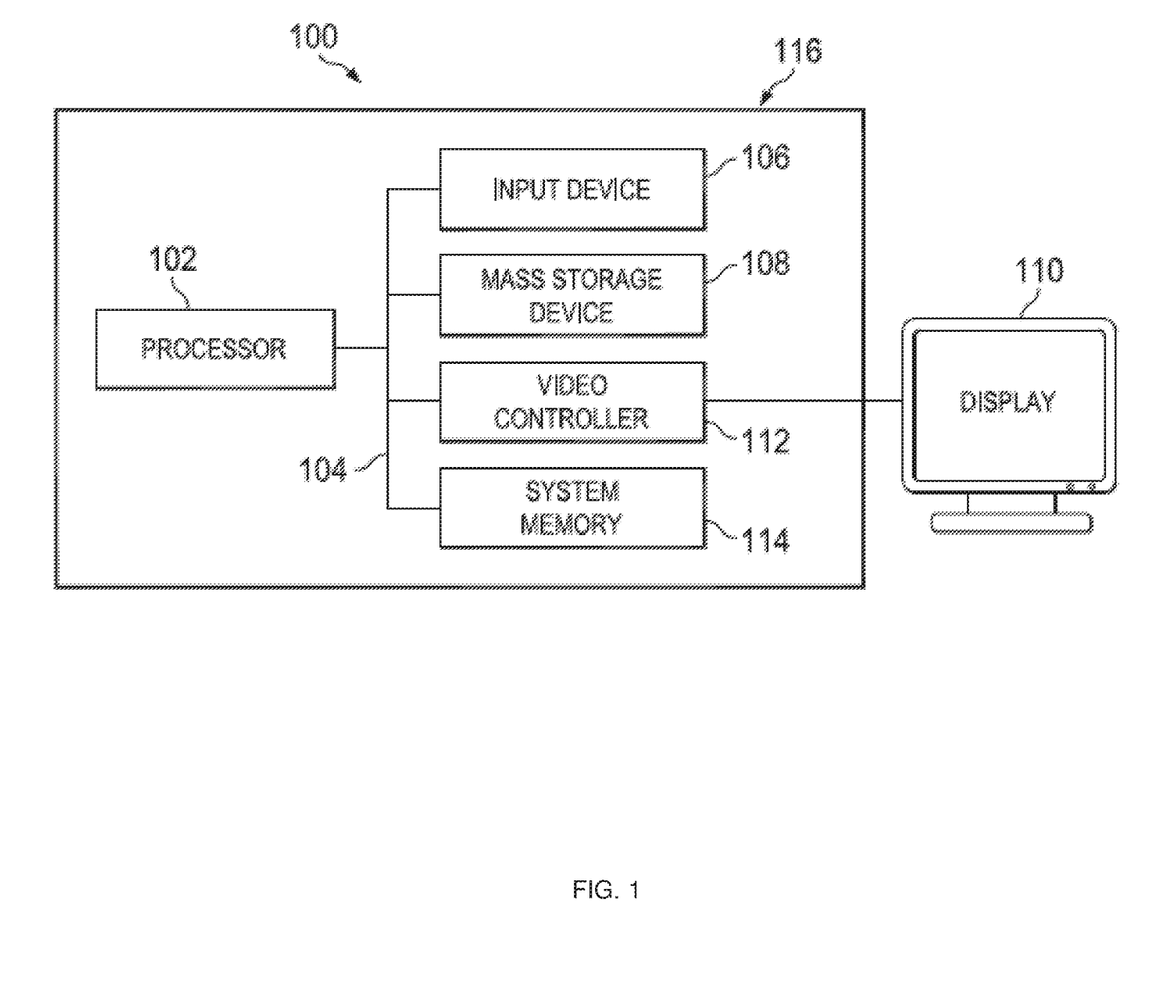
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
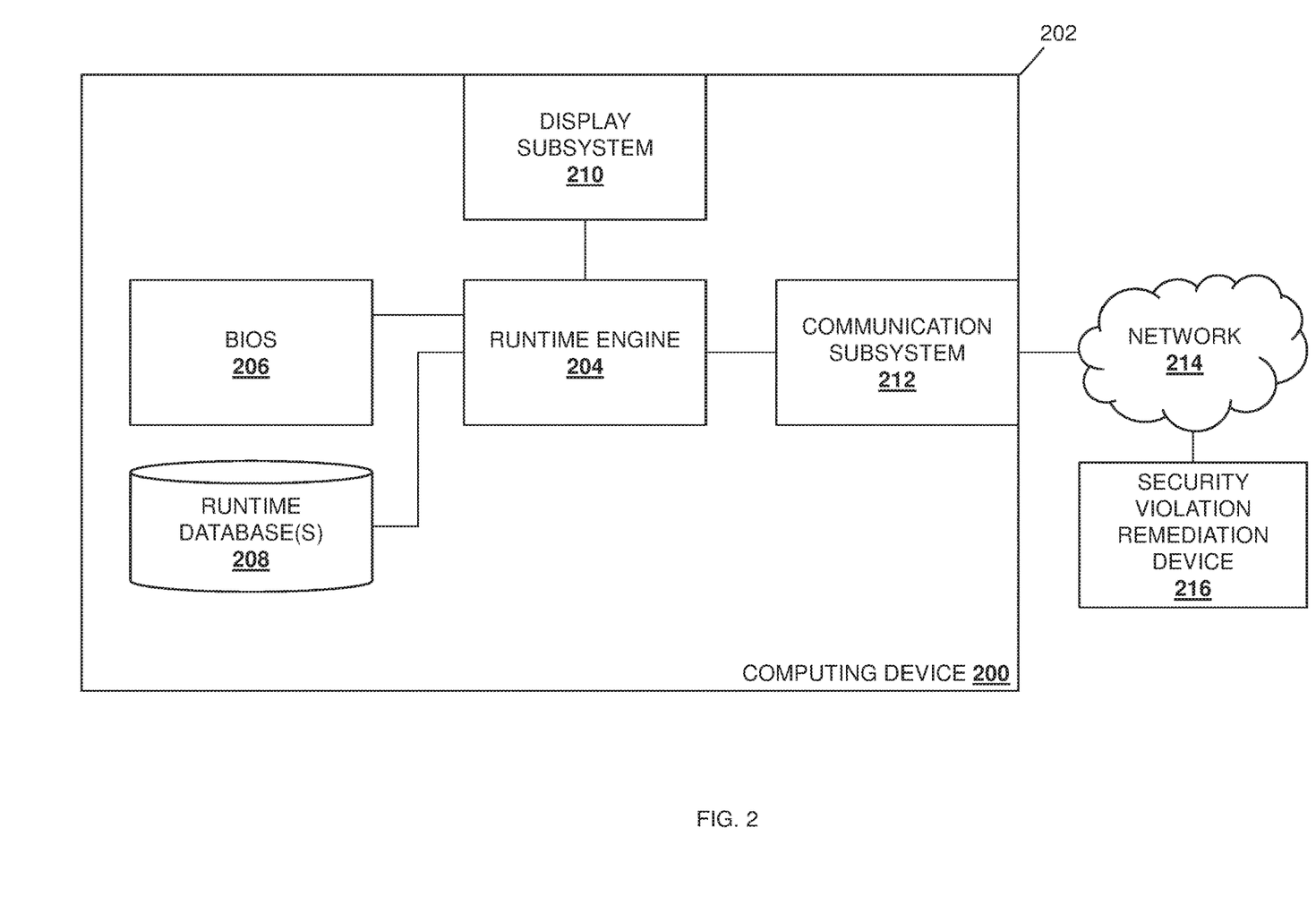
FIG. 2 is a schematic view illustrating an embodiment of a computing device coupled to an administrator device through a network.

Referring now to FIG. 2, an embodiment of a computing device 200 including the modifiable policy action secure boot violation system of the present disclosure is illustrated. In an embodiment, the computing device 200 may be the IHS 100 discussed above with reference to FIG. 1, and/or may include some or all of the components of the IHS 100. In specific examples, the computing device 200 may be a desktop computing device, a laptop/notebook computing device, a tablet computing device, a mobile phone, a server computing device, and/or a variety of other computing devices that would be apparent to one of skill in the art in possession of the present disclosure. In the illustrated embodiment, the computing device 200 includes a chassis 202 that houses the components of the computing device 200, only some of which are illustrated in FIG. 2. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a runtime engine 204 that is configured to perform the functionality of the runtime engines and/or computing devices discussed below.

In the illustrated embodiment, the computing device 200 also includes a Basic Input/Output system (BIOS) 206 that is housed in the chassis 202 and coupled to the runtime engine 204 (e.g., via a coupling between the BIOS 206 and the processing system). One of skill in the art in possession of the present disclosure will recognize that the BIOS 206 discussed in the examples below is provided according to Universally Extensible Firmware Interface (UEFI) specification(s), but other BIOS implementations will fall within the scope of the present disclosure as well. The BIOS 206 may be provided by non-volatile firmware that is configured to perform hardware initialization during a boot process for the computing device 200 (e.g., a power-on startup, restart, and/or other initialization of the computing device 200), provide runtime services for operating systems and/or programs executed by the runtime engine 204, and/or perform any other conventional BIOS functionality known in the art (in addition to the novel functionality described below.) While the primary example discussed below describes the installation and modification of policy action entries, and the performance of policy actions associated with those policy action entries, by the BIOS in response to security violations that occur during a boot process, one of skill in the art will recognize that the BIOS functionality discussed below may be extended to at least some situations that include security violations and/or other that occur (and/or other integrity verification) during runtime while remaining within the scope of the present disclosure.

The chassis 202 may also house a storage system (not illustrated, but which may include the storage device 108 discussed above with reference to FIG. 1) that is coupled to the runtime engine 204 (e.g., via a coupling between the storage system and the processing system) and that includes one or more runtime database(s) 208 that include any of the information for providing the runtime operations (e.g., executing operating systems, programs, applications, etc.) discussed below. The chassis 202 may also house a display subsystem 210 that is coupled to the runtime engine 204 (e.g., via a coupling between the display subsystem 210 and the processing system) and that is configured to display any of the information discussed below. The chassis 202 may also house a communication subsystem 212 that is coupled to the runtime engine 204 (e.g., via a coupling between the communication subsystem 212 and the processing system) and that may include a Network Interface Controller (NIC), wireless communication subsystems (e.g., a BLUETOOTH® communication subsystem, a Near Field Communication (NFC) subsystem, and/or other wireless communication components known in the art), and/or any other communication components that would be apparent to one of skill in the art in possession of the present disclosure. While a specific example of a computing device 200 has been described, one of skill in the art in possession of the present disclosure will recognize that the computing device 200 may include a variety of different components and/or component configurations (other than those explicitly illustrated herein) to enable conventional computing device functionality (as well as the functionality discussed below), while remaining within the scope of the present disclosure.

In the illustrated embodiment, the computing device 200 is coupled via the communication subsystem 212 to a network 214 such as, for example, a Local Area Network (LAN), the Internet, and/or any other network that would be apparent to one of skill in the art in possession of the present disclosure. A security violation remediation device 216 is coupled to the network 214 as well, and may be provided by the IHS 100 discussed above with reference to FIG. 1, and/or may include some or all of the components of the IHS 100. In the examples described below, the security violation remediation device 216 may be controlled by a network administrator, by a computing device security monitoring system (e.g., providing the "remediation cloud" described herein), and/or by a variety of other security violation remediation entities or systems that would be apparent to one of skill in the art in possession of the present disclosure.

Figure 3:
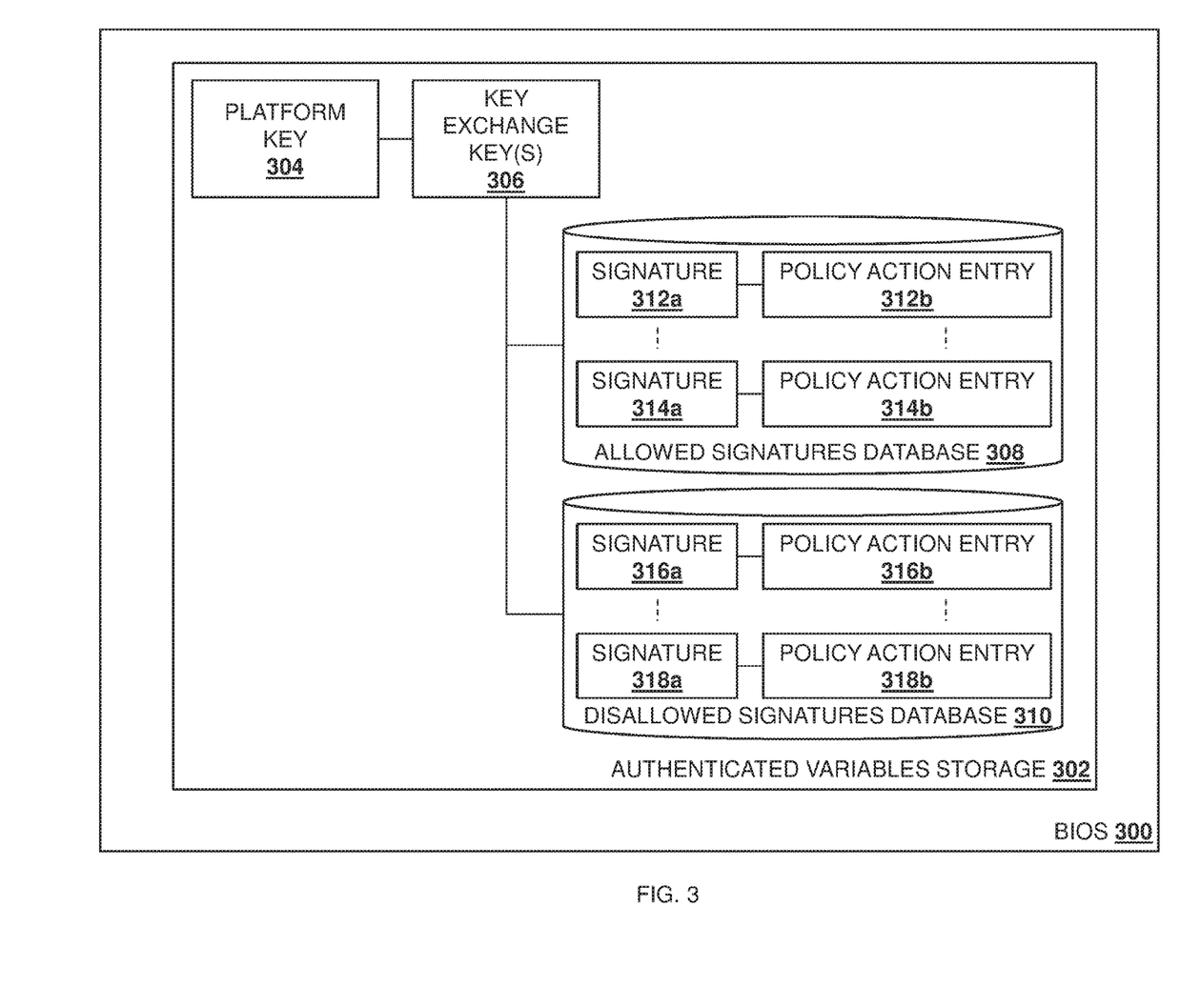
FIG. 3 is a schematic view illustrating a BIOS subsystem that may be included in the computing device of FIG. 2.

Referring now to FIG. 3, an embodiment of a Basic Input/Output System (BIOS) 300 is illustrated that may be the BIOS 206 discussed above with reference to FIG. 2. The embodiment illustrated in FIG. 3 provides an example of a BIOS that is configured to perform the novel functionality of the present disclosure, and one of skill in the art in possession of the present disclosure will recognize that the BIOS may include other components and or different component configurations that enable conventional BIOS functionality, as well as the functionality discussed below, while remaining within the scope of the present disclosure. The BIOS 300 includes a secured storage system that is provided in the illustrated example by authenticated variables storage 302 in the BIOS 300, although other secured storage systems may fall within the scope of the present disclosure as well. At least one authorization key is included in the secured storage system, with the illustrated example providing a platform key 304 (e.g., an X509 key) and key exchange key(s) 306 (e.g., X509 keys or RSA2048 keys) that are included in the authenticated variables storage 302. As would be understood by one of skill in the art, the platform key 304 may provide full control over the secure boot key hierarchy, with the entity that controls the platform key 304 (e.g., a computing device manufacturer or an Outside Equipment Manufacturer (OEM)) able to use that platform key to perform conventional operations such as installing new platform keys, installing or updating key exchange keys, and/or performing other platform key functionality that would be apparent to one of skill in the art in possession of the present disclosure. In addition, the present disclosure describes enhancements to platform key functionality that may allow it to be used to install, update, or otherwise modify policy action entries in the signatures databases as discussed below.

As would also be understood by one of skill in the art, the key exchange key(s) 306 may be installed or updated by the entity that controls the platform key 304 and may be provided, for example, to an operating system vendor and/or other software providers to sign executable Extensible Firmware Interface (EFI) binaries directly or provide signatures or certificates in the signatures databases. In addition, the present disclosure describes enhancements to key exchange key functionality that may allow key exchange key(s) 306 to be used to install, update, or otherwise modify policy action entries in the signatures databases as discussed below. As such, conventional use of the platform key 304 and key exchange key(s) 306 include a hardware manufacturer installing the platform key 304 on newly manufactured hardware (e.g., the computing device 200), and installing key exchange keys for the operating system vendor(s) as well as themselves, with the key exchange key(s) issued to the operating system vendors and used by the operating system vendors and/or the hardware manufacturer to update conventional signature database(s) with signatures that, if generated during a boot process of the computing device, cause the BIOS to perform an action that is hard-coded in the computing device 200 outside the BIOS.

At least one signatures database is included in the secured storage system, with the illustrated example providing an allowed signatures database 308 (e.g., the "DB") and a disallowed signatures database 310 (e.g., the "DBX") that are included in the authenticated variables storage 302. Similarly as discussed above, the allowed signatures database 308 may include one or more signatures (e.g., hash results, certificate signatures, etc.) such as the signatures 312a and up to 314a that, if seen during a conventional boot process for the computing device 200, allow that boot process to complete such that the computing device 200 enters runtime operation. However, the present disclosure provides for the association of one or more policy action entries with the signatures in the allowed signatures database 308 such as, for example, the policy action entry 312b associated with the signature 312a and the policy action entry 314b associated with the signature 314a, that are configured to cause the BIOS 300 to perform associated policy actions if the boot process produces a signature that does not match the signatures 312a and up to 314a, discussed in further detail below.

Also similarly as discussed above, the disallowed signatures database 310 may include one or more signatures (e.g., hash results, certificate signatures, etc.) such as the signatures 316a and up to 318a that, if seen during a conventional boot process for the computing device 200, prevent that boot process from completing such that the computing device 200 does not enter runtime operation. However, the present disclosure provides for the association of one or more policy action entries with the signatures in the disallowed signatures database 310 such as, for example, the policy action entry 316b associated with the signature 316a and the policy action entry 318b associated with the signature 318a, that are configured to cause the BIOS 300 to perform associated policy actions depending on whether the boot process produces a signature that matches the signatures 316a and up to 316a, discussed in further detail below. While a specific BIOS 300 that is configured to provide secure boot operations is illustrated and described in FIG. 3, one of skill in the art in possession of the present disclosure will recognize that the BIOS 300 may include different components and/or different component configurations that will provide the secure boot violation functionality discussed below, as well as runtime security violation remediation and/or integrity verification, while remaining within the scope of the present disclosure.

Figure 4:
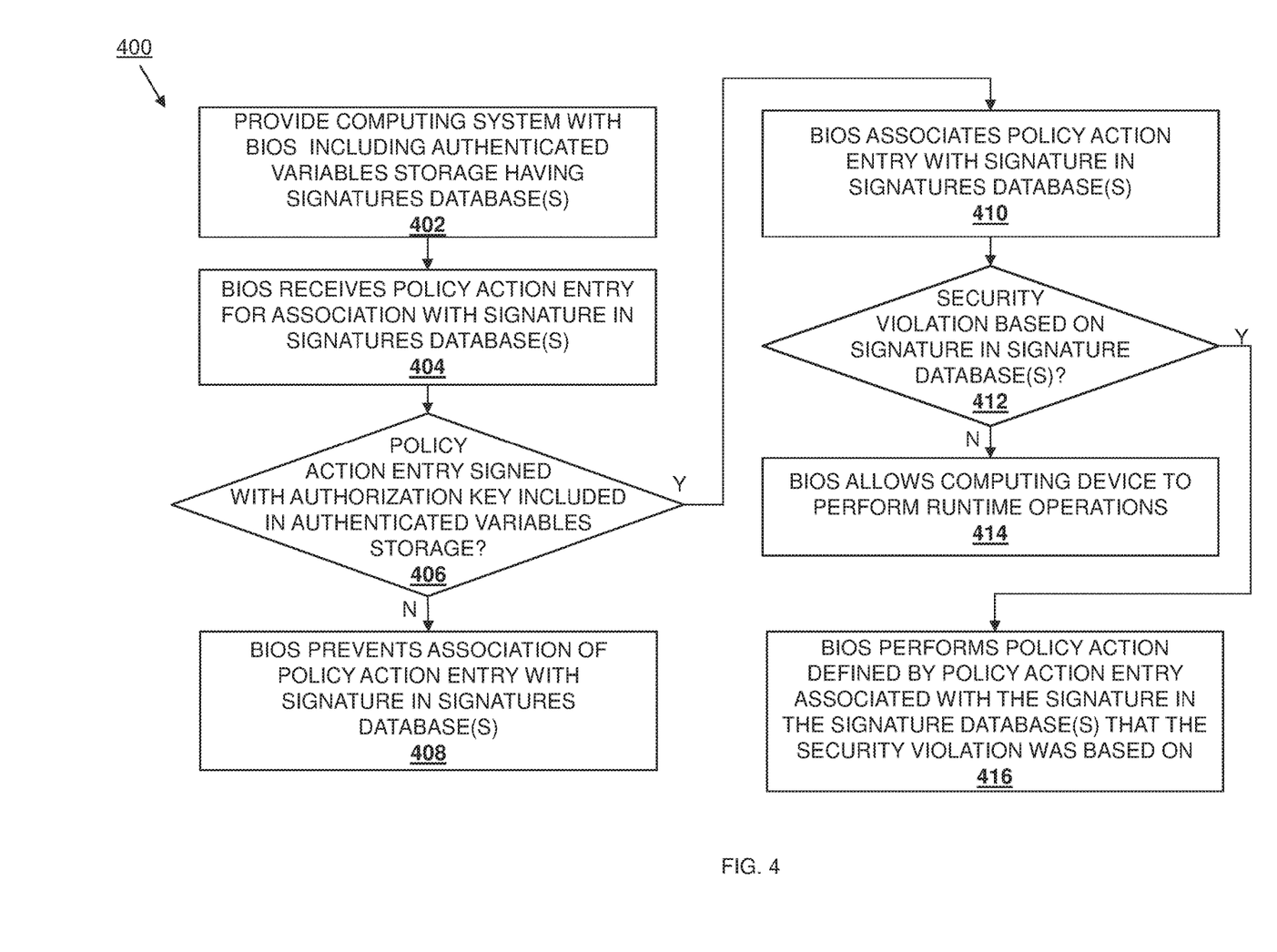
FIG. 4 is a flow chart illustrating a method for providing a secure boot process with modifiable policy actions.

Referring now to FIG. 4, an embodiment of a method 400 for providing a secure boot process with modifiable policy actions is illustrated. As discussed below, the systems and methods of the present disclosure provide a novel BIOS having an authenticated variable storage with an "extended" signature(s) databases that include policy action entries that are associated with specific signatures and that define policy actions to perform when a security violation (e.g., a secure boot violation) that is based on its associated signature is detected. Policy action entries may be associated with signatures in the signature database(s) by signing those policy action entries with an authentication key stored in the authenticated variable storage (e.g., the platform key or one of the key exchange keys), and providing those policy action entries to the BIOS. When the BIOS receives a call to install or update a policy action entry associated with a signature in the signature database(s), it ensures those policy action entries are signed with a valid authentication key stored in the authenticated variable storage and, in response, deploys that policy action entry in association with the identified signature. Any deployed policy action entry is treated as an authenticated variable (i.e., requiring signing with a valid authentication key before deployment), and is configured to cause the BIOS to perform its associated policy action when a security violation occurs based on the signature in the signature database(s) that it is associated with, which provides for the performance of policy actions that are relevant to the known severity of the security violation that has occurred, improving on conventional BIOS operation that is limited to static policy actions that are hard-coded outside that conventional BIOS and that are typically limited to halting the operation of the computing device.

The method 400 begins at block 402 where a computing system is provided with BIOS including an authenticated variable storage having one or more signature databases. With reference to FIGS. 2 and 3, in an embodiment of block 402, a computing device manufacturer or Outside Equipment Manufacturer (OEM) (the "hardware manufacturer" below) may manufacture the computing device 200 of FIG. 2 that includes the BIOS 206/300 having the authenticated variable storage 302. As discussed above, the hardware manufacturer may install the platform key 304 in the authenticated variables storage 302, and use the platform key 304 to install the key exchange key(s) 306 in the authenticated variables storage 302 for each of the hardware manufacturer, one or more operating system vendors, other software providers, and/or other entities that would be apparent to one of skill in the art in possession of the present disclosure. In some of the specific examples discussed below, at least one of the key exchange keys 306 is installed in the authenticated variables storage 302 for use by an administrator of a network (e.g., via an administration console) that will include the computing device 200, or even a user of the computing device 200 in some situations. As such, key exchange keys may be provided for an authorized entity to enable that authorized entity to add/modify/delete the policy actions of the present disclosure.

As also discussed above, the BIOS 206/300 may include the allowed signatures database 308 (e.g., the "DB") and the disallowed signatures database 310 (e.g., the "DBX") in the authenticated variables storage 302, and in many embodiments the hardware manufacturer may manufacture the computing device 200 to include default signatures associated with default policy action entries in either or both of the allowed signatures database 308 and the disallowed signatures database 310. In one embodiment of the provisioning of a default policy action, the hardware manufacturer may utilize the platform key 304 or its key exchange key 306 to sign a hash result and provide the signed hash result to the BIOS 206/300 such that it is added to the allowed signatures database 308 (e.g., as the signature 312a), and utilize the platform key 304 or its key exchange key 306 to sign a policy action entry and provide that signed policy action entry to the BIOS 206/300 for association with the hash result/signature 312a in the allowed signatures database 308 (e.g., as the policy action entry 312b). For example, the hash result/signature 312a may be determined by performing hashing operations (e.g., a SHA-256 hashing operation or other hashing operation known in the art) on boot code that is executed by the BIOS 206/300 during a boot process for the computing device 200 (e.g., a bootloader), and the policy action entry 312b may be associated with a default policy action that causes the BIOS 206/300 to halt the operation of the computing device to prevent the runtime engine 204 from performing runtime operations in the event the hashing operation is performed on the boot code prior to the boot process and the hash result is not obtained (indicating that the boot code has been modified.)

In another embodiment of the provisioning of a default policy action, the hardware manufacturer may utilize the platform key 304 or its key exchange key 306 to sign a certificate and provide that certificate to BIOS 206/300 300 such that is added to the allowed signatures database 308 (e.g., as the signature 314a), and utilize the platform key 304 or its key exchange key 306 to sign a policy action entry and provide that signed policy action entry to the BIOS 206/300 for association with the certificate/signature 314a in the allowed signatures database 308 (e.g., as the policy action entry 314b). For example, the certificate/signature 314a may be included with boot code (e.g., a bootloader) that is executed by the BIOS 206/300 during a boot process for the computing device 200, and the policy action entry 314b may be associated with a default policy action that causes the BIOS 206/300 to halt the operation of the computing device to prevent the runtime engine 204 from performing runtime operations in the event boot code is loaded for executing the boot process that does not successfully verify against a specific certificate or signature in the signatures database. As such, boot code may include a certificate (that includes a public key) along with a signature that is signed with the private key associated with the certificate/public key, and the BIOS may verify that the certificate is in the secure boot signature database and attempt to verify the signature of the boot code using the public key.

In another embodiment of the provisioning of a default policy action, the hardware manufacturer may utilize the platform key 304 or its key exchange key 306 to sign a hash result and provide the signed hash result to the BIOS 206/300 such that it is added to the disallowed signatures database 310 (e.g., as the signature 316a), and utilize the platform key 304 or its key exchange key 306 to sign a policy action entry and provide that signed policy action entry to the BIOS 206/300 for association with the hash result/signature 316a in the disallowed signatures database 310 (e.g., as the policy action entry 316b). For example, the hash result/signature 316a may be determined by performing hashing operations (e.g., a SHA-256 hashing operation or other hashing operation known in the art) on malicious code that is known to the hardware manufacturer, and the policy action entry 316b may be associated with a default policy action that causes the BIOS 206/300 to halt the operation of the computing device to prevent the runtime engine 204 from performing runtime operations in the event the hashing operation is performed on code that has been loaded for execution and the hash result is obtained.

In another embodiment of the provisioning of a default policy action, the hardware manufacturer may utilize the platform key 304 or its key exchange key 306 to sign a certificate and provide that certificate to the BIOS 206/300 such that is added to the disallowed signatures database 310 (e.g., as the signature 318a), and utilize the platform key 304 or its key exchange key 306 to sign a policy action entry and provide that signed policy action entry to the BIOS 206/300 for association with the signed certificate/signature 318a in the disallowed signatures database 310 (e.g., as the policy action entry 318b). For example, the signed certificate/signature 316a may identify a "bad" or malicious certificate, and the policy action entry 316b may be associated with a default policy action that causes the BIOS 206/300 to halt the operation of the computing device to prevent the runtime engine 204 from performing runtime operations in the event malicious code includes the "bad" or malicious certificate.

The hardware manufacturer may then install an operating system and/or other software (provided by an operating system vendor or other software provided) on the computing device 200 before providing the computing device 200 to a user or network administrator of a network in which that the computing device 200 will be included. While a few examples have been provided, one of skill in the art in possession of the present disclosure will appreciate that a variety of default policy action entries may be provided in the signatures database(s) while remaining within the scope of the present disclosure. Furthermore, one of skill in the art in possession of the present disclosure will recognize how BIOS 206/300 of the present disclosure differs from the conventional BIOS utilized in conventional secure boot systems based on the storage of the default policy action entries in the signature databases included in the authenticated variables storage of the BIOS, rather than hard-coded in the computing device 200 outside the BIOS.

The method 400 then proceeds to block 404 where the BIOS receives a policy action entry for association with a signature in the signature database(s). In an embodiment, at block 404, the BIOS 206/300 receives a policy action entry for association with a signature in the allowed signatures database 308 and/or the disallowed signatures database 310. For example, at block 404, the policy action entry may be provided to the BIOS 206/300 through the network. As discussed in the different examples below, the policy action entry may be received by the BIOS 206/300 at block 404 from the hardware manufacturer, an operating system vendor (e.g., via an operating system provided on the computing device 200 by the hardware manufacturer) or other software vendor (e.g., via software provided on the computing device 200 by the hardware manufacturer), by the network administrator of a network the computing device 200 is included in, by a user of the computing device 200, or by a malicious third party. However, one of skill in the art in possession of the present disclosure will recognize that the policy action entry received by the BIOS 206/300 at block 404 may be provided by any of a variety of entities that will fall within the scope of the present disclosure.

In some embodiments of block 404, the BIOS 206/300 may receive a policy action entry for association with an existing signature in the allowed signatures database 308 and/or the disallowed signatures database 310, while in other embodiments of block 404, the BIOS 206/300 receive both a new signature and a policy action entry for association in the allowed signatures database 308 and/or the disallowed signatures database 310. While the discussion below focuses on the installation, replacement, or modification of a policy action entry with an existing signature in the allowed signatures database 308 and/or the disallowed signatures database 310, one of skill in the art in possession of the present disclosure will recognize that the platform exchange key 304 and/or the key exchange keys 306 may be utilized to sign and add new signatures to the allowed signatures database 308 and/or the disallowed signatures database 310 (for association with the policy action entries as detailed below) while remaining within the scope of the present disclosure as well.

The method 400 then proceeds to decision block 406 where the BIOS determines whether the policy action entry is signed with an authorization key included in the authenticated variables storage. In an embodiment of decision block 406, the BIOS 206/300 determines whether the policy action entry received at block 404 has been signed with the platform key 304 or any of the key exchange keys 306 included in the authenticated variables storage 302. For example, the BIOS 206/300 may analyze the policy action entry received at block 404 to determine whether that policy action entry has been signed. If the BIOS 206/300 determines that the policy action entry received at block 404 has been signed, the BIOS 206/300 then analyzes that signature to determine whether it was produced by the platform key 304 or one of the key exchange keys 306. One of skill in the art in possession of the present disclosure would recognize how a signature may be verified as being provided by a known key, and thus the details are not included herein.

If, at decision block 404, the BIOS determines that the policy action entry is not signed with an authorization key included in the authenticated variables storage, the method 400 proceeds to block 408 where the BIOS prevents association of the policy action entry with the signature in the signature database(s). In some embodiment of decision block 406, the BIOS 206/300 may determine that the policy action entry received at block 404 has not been signed, and at block 408 the BIOS 206/300 may prevent the association of that policy action entry with a signature in the allowed signatures database 308 and/or the disallowed signatures database 310 by discarding or otherwise ignoring that policy action entry. In some embodiments of decision block 406, the BIOS 206/300 may determine that the policy action entry received at block 404 has been signed but that the signature was not produced by the platform key 304 or one of the key exchange keys 306, and at block 408 the BIOS 206/300 may prevent the association of that policy action entry with a signature in the allowed signatures database 308 and/or the disallowed signatures database 310 by discarding or otherwise ignoring that policy action entry. As such, a malicious third party that attempts to install or modify a policy action entry in the allowed signatures database 308 and/or the disallowed signatures database 310 without signing that policy action entry, or signing that policy action entry with an invalid authorization key, will be prevented from doing so by the BIOS 206/300. While a few examples have been provided, one of skill in the art in possession of the present disclosure will recognize that the variety of actions may be performed by the BIOS 206/300 in response to determining that a received policy action entry is not signed with an authorization key included in the authenticated variables storage (e.g., sending a notification or alert, etc.) while remaining within the scope of the present disclosure.

If, at decision block 404, the BIOS determines that the policy action entry is signed with an authorization key included in the authenticated variables storage, the method 400 proceeds to block 410 where the BIOS associates the policy action entry with the signature in the signature database(s). In some embodiment of decision block 406, the BIOS 206/300 may determine that the policy action entry received at block 404 has been signed and that the signature was produced by the platform key 304 or one of the key exchange keys 306, and at block 410 the BIOS 206/300 associates that policy action entry with a signature in the allowed signatures database 308 and/or the disallowed signatures database 310. As discussed above, in some embodiments the policy action entry received at block 404 may identify one or more signatures that are included in or that are to-be added to the allowed signatures database 308 and/or the disallowed signatures database 310 and, upon determining that that policy action entry includes a signature produced by the platform key 304 or one of the key exchange keys 306, the BIOS 206/300 may use the identified signature(s) in that policy action entry to associate that policy action entry with existing signature(s) in the allowed signatures database 308 and/or the disallowed signatures database 310, or add the identified signature(s) and associated policy action entry to the allowed signatures database 308 and/or the disallowed signatures database 310.

For example, the BIOS 206/300 may determine at block 406 that the policy action entry received at block 404 includes a signature that was produced by the platform key 304 or one of the key exchange keys 306 controlled by the hardware manufacturer and, in response, associate the policy action entry with signature(s) in the allowed signatures database 308 and/or the disallowed signatures database 310. As such, the hardware manufacturer may replace/modify a default policy action entry that was associated with any of the signatures in the allowed signatures database 308 and/or the disallowed signatures database 310 at block 402, or install new policy action entries associated with new signatures in the allowed signatures database 308 and/or the disallowed signatures database 310 at block 402. Similarly, the BIOS 206/300 may determine at block 406 that the policy action entry received at block 404 includes a signature that was produced by one of the key exchange keys 306 controlled by one of the operating system vendors and/or other software vendors and, in response, associate the policy action entry with signature(s) in the allowed signatures database 308 and/or the disallowed signatures database 310. As such, operating system vendors and/or other software vendors may replace/modify a default policy action entry that was associated with any of the signatures in the allowed signatures database 308 and/or the disallowed signatures database 310 at block 402, or install new policy action entries associated with new signatures in the allowed signatures database 308 and/or the disallowed signatures database 310 at block 402.

Also similarly, the BIOS 206/300 may determine at block 406 that the policy action entry received at block 404 includes a signature that was produced by one of the key exchange keys 306 controlled by one of the network administrator of the network that includes the computing device 200 or a user of the computing device 200 and, in response, associate the policy action entry with signature(s) in the allowed signatures database 308 and/or the disallowed signatures database 310. As such, network administrators or users may replace/modify a default policy action entry that was associated with any of the signatures in the allowed signatures database 308 and/or the disallowed signatures database 310 at block 402, or install new policy action entries associated with new signatures in the allowed signatures database 308 and/or the disallowed signatures database 310 at block 402. While a few specific examples of entities that may replace/modify policy action entries associated with existing signatures or install new policy action entry/signature associations in the signatures database(s) have been described, one of skill in the art in possession of the present disclosure will recognize the other entities may cause policy action entries to be associated with signatures similarly as discussed above while remaining within the scope of the present disclosure.

Figure 5:
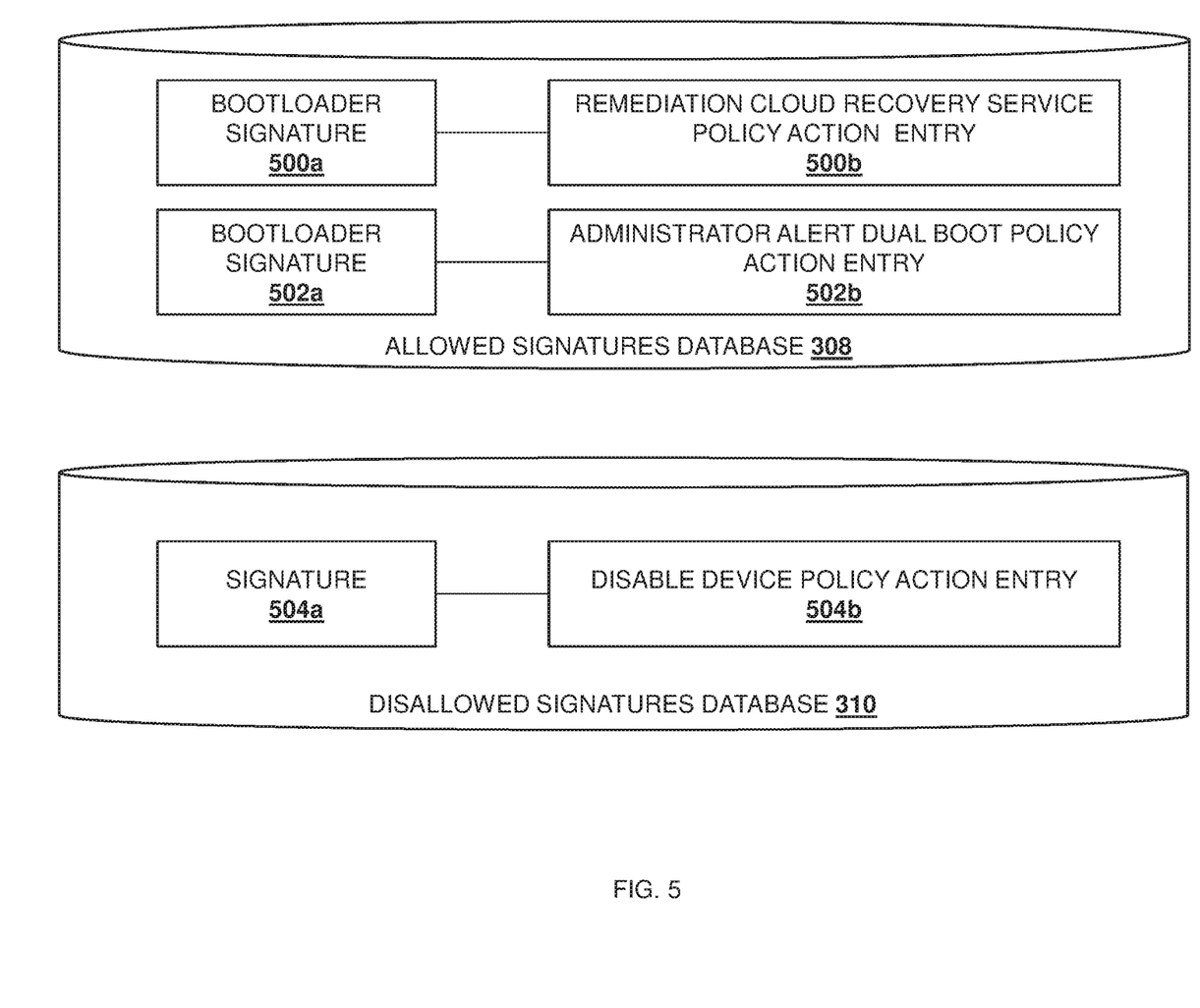
FIG. 5 is a schematic view illustrating an embodiment of allowed and disallowed code databases with modified policy actions associated with hash results or certificates.

With reference to FIG. 5, an embodiment of the allowed signatures database 308 and the disallowed signatures database 310 is illustrated that includes signature/policy action entry associations that may be provided by the policy action entry installation and/or replacement/modification functionality discussed above. For example, in the illustrated embodiment, the allowed signatures database 308 includes a bootloader signature 500a that is associated with a remediation cloud recovery policy action entry 500b which may provide, in the event that bootloader code is provided for execution during boot and does not include an expected signature (e.g., a hash result, a certificate signature, or other signature), that a recovery process be conducted by accessing a remediation cloud recovery service through a network, discussed in further detail below. Furthermore, in the illustrated embodiment, the allowed signatures database 308 includes a bootloader signature 502a that is associated with an administrator alert dual boot policy action entry 502b which may provide, in the event that bootloader code is provided for execution during boot and produces a signature (e.g., a hash result, a certificate signature, or other signature) that is associated with one of multiple operating systems available for booting on the computing device 200 (e.g., a LINUX® operating system when a WINDOWS(S) operating system is also available for booting on the computing device 200), that an administrator of the network that includes the computing device be alerted, discussed in further detail below.

Furthermore, in the illustrated embodiment, the disallowed signatures database 310 includes a signature 504a that is associated with a disable device policy action entry 504b which may provide, in the event that code is provided for execution during boot and produces a particular signature (e.g., a hash result, a certificate signature, or other signature) that may be associated with malicious code, that the computing device 200 be disabled by, for example, permanently disabling ("bricking") the computing device, discussed in further detail below. While a few specific examples of signature/policy action entry associations have been described, one of skill in the art in possession of the present disclosure will appreciate that virtually any signature may be provided in the allowed signatures database 308 or disallowed signatures database 310 and associated with virtually any policy action entry deemed appropriate by the hardware manufacturer, operating system or other software vendor, and/or network administrator/user of the computing device 200, while remaining within the scope of the present disclosure. Following block 410, the method 100 in the illustrated embodiment describes actions performed by the BIOS 206/300 during any subsequent boot process conducted for the computing device 200. However, one of skill in the art in possession of the present disclosure will recognize that blocks 404, 406, and 410 of the method 400 may be repeated at any time to install and/or replace/modify policy action entries substantially as described above. As such, a "first" policy action entry associated with a signature in the signature database(s) may be replaced by (or modified to create) a "second" policy action entry, and so on.

The method 400 then proceeds to decision block 412 where the BIOS determines whether a security violation based on a signature in the signature database(s) has occurred. In an embodiment, at decision block 412, the BIOS uses the signatures in the signature database(s) (e.g., the signatures 312a and up to 314a in the allowed signatures database 308, or the signatures 316a and up to 318a in the disallowed signatures database 310) to determine whether a security violation has occurred. For example, during a boot process for the computing device 200, the BIOS 206/300 may perform a secure boot process that may include verifying the bootloader, verifying the option Read Only Memory (OROM) card, verifying the BIOS modules, and/or performing other secure boot actions known in the art. One or more times during that boot process, the BIOS 206/300 may determine a boot process signature for any code that loaded for execution during that boot process by, for example, performing a hash operation on that code, identifying a certificate signature provided with that code, and/or by performing any other signature determination processes known in the art. For each boot process signature determined during the boot process, the BIOS 206/300 may then determine whether that boot process signature matches any of the signatures 312a and up to 314a in the allowed signatures database 308, or any of the signatures 316a and up to 318a in the disallowed signatures database 310. While the discussion herein focuses on secure boot violations that occur during a boot process for the computing device 200, the BIOS may determine security violations that occur during runtime, and/or perform other integrity verifications, in a similar manner while remaining within the scope of the present disclosure.

If, at decision block 412, the BIOS determines that a security violation based on a signature in the signature database(s) has not occurred, the method 400 proceeds to block 414 where the BIOS allows the computing device to perform runtime operations. In an embodiment, at block 412, the BIOS 206/300 may determine that no secure boot violation has occurred that is based on a boot process signature in the allowed signatures database 308 or the disallowed signatures database 310 in response to determining that a signature that was determined for code that is loaded for execution during the boot process is included in the allowed signatures database 308, or in response to determining that a boot process signature that was determined for code that is loaded for execution during the boot process is not included in the disallowed signatures database 310. In response to determining that no secure boot violation has occurred at decision block 412, at block 410 the BIOS 206/300 allows the computing device 200 to perform runtime operations by, for example, completing the boot process for the computing device 200 such that the runtime engine 204 may load the operating system and/or any other applications provided in the runtime databases 208, and perform runtime operations using that operating system and/or those applications.

If, at decision block 412, the BIOS determines that a security violation based on a signature in the signature database(s) has occurred, the method 400 proceeds to block 416 where the BIOS performs a policy action defined by the policy action entry that is associated with the signature in the signature database(s) that the security violation was based on. In an embodiment, at block 412, the BIOS 206/300 may determine that a secure boot violation has occurred that is based on a signature in the allowed signatures database 308 or the disallowed signatures database 310 in response to determining that a boot process signature that was determined for code that is loaded for execution during the boot process is not included in the allowed signatures database 308, or in response to determining that a boot process signature that was determined for code that is loaded for execution during the boot process is included in the disallowed signatures database 310. In response to determining that a secure boot violation has occurred at decision block 412, at block 416 the BIOS 206/300 performs a policy action defined by the policy action entry that is associated with the signature in the signature database(s) that the secure boot violation was based on.

With reference back to FIG. 5, in the event the boot process signature boot process signature that was determined for code that is loaded for execution during the boot process does not match the bootloader signature 500a in the allowed signatures database 308, the BIOS 206/300 may perform a remediation cloud recovery policy action defined by the remediation cloud recovery policy action entry 500b that is associated with that bootloader signature 500a. As discussed above, the remediation cloud recovery policy action may cause the BIOS 300 to perform a recovery process by accessing a remediation cloud recovery service that is provided by the security violation remediation device 216 through the network 214, which may include the BIOS 206/300 performing the boot process for the computing device 200 using a boot recovery service operating system that is provided through the network 214 by the security violation remediation device 216 (e.g., a cloud based boot and service OS installation) and that allows for an analysis of the secure boot violation. Furthermore, in some examples, the policy action entry associated with the bootloader signature 500a in the allowed signatures database 308 may cause the BIOS 206/300 to perform a recovery process by performing the boot process for the computing device 200 using an original (e.g., manufacturer provided) operating system that may be stored locally on the computing device 200.

Similarly, in the event the boot process signature boot process signature that was determined for code that is loaded for execution during the boot process matches the bootloader signature 502a in the allowed signatures database 308 that is associated with one of multiple operating systems available for booting on the computing device 200, the administrator of the network that includes the computing device be alerted by the BIOS 206/300, which allows the network administrator to be alerted, for example, whenever a user of the computing device 200 boots a non-default operating system (e.g., a LINUX® operating system when a WINDOWS(S) operating system is provided as the default operating system on the computing device 200). Similarly, in the event the boot process signature that was determined for code that is loaded for execution during the boot process matches the signature 504a that is associated with disabled device policy action entry 504b, the BIOS 206/300 may cause the computing device 200 be disabled by, for example, permanently disabling ("bricking") the computing device (e.g., performing a secure erase of storage device(s) included on the computing device 200), which allows, for example, a network administrator to define an extreme security action in response to the detection of malicious code that would otherwise likely not be implemented due to its ramifications.

As such, just a few of the policy actions that may be provided include invoking a cloud-based boot and deploying a service operating system over a network (or stored locally) to remediate a secure boot violation associated with bootloader code that produces an unauthorized signature, booting a service operating system and deploying an OROM with an authorized signature when the OROM signature for a video card is unauthorized, and securely wiping the hard drive of a computing device when its bootloader produces an unauthorized signature. Furthermore, policy actions may be chosen for known, but relatively minor secure boot violations, that provide for the alerting of a user or network administrator rather than conventional policy actions that result in halting of the computing device. While a few specific examples have been described, one of skill in the art will recognize that the policy action performed at block 416 may provide for any result desired by the provider of its policy action entry.

Thus, systems and methods have been described that provide a novel BIOS having an authenticated variable storage with "extended" signature(s) databases that associate policy action entries with signatures to define policy actions to perform when a security violation (e.g., a secure boot violation) that is based on its associated signature is detected. Policy action entries/signature association security is ensured by requiring the signing of the policy action entries with an authentication key stored in the authenticated variable storage (e.g., the platform key or one of the key exchange keys) before those policy action entries are deployed. Thus, the BIOS treats any deployed policy action entry as an authenticated variable (i.e., requiring signing with a valid authentication key before deployment), and performs its defined policy action when a security violation occurs based on its associated signature, which provides for the performance of policy actions that are relevant to the known severity of the security violation that has occurred, improving on conventional systems that are limited to static policy actions that are hard-coded outside conventional BIOS and that are typically only provide for halt of the operation of the computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secure boot violation system, comprising:
a Basic Input/Output System (BIOS) including an authenticated variables hardware storage;
at least one authorization key included in the authenticated variables hardware storage; and
at least one signatures database included in the authenticated variables hardware storage, wherein the BIOS is configured to:
receive a first policy action entry for association with a first signature in the at least one signatures database, wherein the first signature is associated with a default policy action entry, and wherein the first policy action entry defines a first policy action to perform when a security violation is detected;
determine that the first policy action entry is signed with the at least one authorization key and, in response, associate the first policy action entry with the first signature in the at least one signatures data base such that the first policy action entry is stored with the first signature in the at least one signatures database;
generate, as part of a boot process and subsequent to the associating the first policy action entry with the first signature, a second signature;
compare the second signature to the first signature and, in response, determine that a first secure boot violation has occurred; and
perform, in response to determining that the first secure boot violation has occurred, the first policy action defined by the first policy action entry.

2. The system of claim 1, wherein the BIOS is configured to:
receive a second policy action entry for association with the first signature in the at least one signatures database;
determine that the second policy action entry is signed with the at least one authorization key and, in response, replace the first policy action entry associated with the first signature in the at least one signatures database with the second policy action entry;
generate, as part of the boot process and subsequent to associating the second policy action entry with the first signature, a third signature;
compare the second signature to the first signature and, in response, determine that a second secure boot violation has occurred; and
perform, in response to determining that the second secure boot violation has occurred, a second policy action defined by the second policy action entry.

3. The system of claim 1, wherein the at least one authorization key includes a platform key and a key exchange key, and wherein the determining that the first policy action entry is signed with the at least one authorization key includes determining that the first policy action entry is signed with the key exchange key.

4. The system of claim 1, wherein the at least one signatures database includes an allowed signatures database and a disallowed signatures database, and wherein the determining that the first secure boot violation has occurred includes:
determining that the second signature does not match the first signature in the allowed signatures database.

5. The system of claim 1, wherein the at least one signatures database includes an allowed signatures database and a disallowed signatures database, and wherein the determining that the first secure boot violation has occurred includes:
determining that the second signature matches the first signature in the disallowed signatures database.

6. The system of claim 1, wherein the first policy action includes one of:
performing, through a network, at least one recovery action that is configured to remedy the first secure boot violation; and
securely erasing a storage device coupled to the BIOS.

7. The system of claim 1, wherein the first policy action entry replaces the default policy action entry.

8. An Information Handling System (IHS), comprising:
a chassis;
a secured storage system that is housed in the chassis;
a processing system that is housed in the chassis and that is coupled to the secured storage system; and
a memory system that is housed in the chassis, that is coupled to the processing system, and that includes instructions that, when executed by the processing system, cause the processing system to provide a Basic Input/Output System (BIOS) that is configured to:
receive a first policy action entry for association with a first signature in at least one signatures database provided in the secured storage system, wherein the first signature is associated with a default policy action entry, and wherein the first policy action entry defines a first policy action to perform when a security violation is detected;
determine that the first policy action entry is signed with at least one authorization key that is stored in the secured storage system and, in response, associate the first policy action entry with the first signature in the at least one signatures data base in the secured storage system such that the first policy action entry is stored with the first signature in the at least one signatures database;
generate, as part of a boot process and subsequent to the associating the first policy action entry with the first signature, a second signature;

compare the second signature to the first signature and, in response, determine that a first security violation has occurred; and perform, in response to determining that the first security violation has occurred, the first policy action defined by the first policy action entry.

9. The IHS of claim 8, wherein the BIOS is configured to:
receive a second policy action entry for association with the first signature in the at least one signatures database provided in the secured storage system;

determine that the second policy action entry is signed with the at least one authorization key that is stored in the secured storage system and, in response, replace the first policy action entry associated with the first signature in the at least one signatures database provided in the secured storage system with the second policy action entry;

generate, as part of the boot process and subsequent to associating the second policy action entry with the first signature, a third signature;

compare the second signature to the first signature and, in response, determine that a second security violation has occurred; and perform, in response to the determining that the second security violation has occurred, a second policy action defined by the second policy action entry.

10. The IHS of claim 8, wherein the at least one authorization key includes a platform key and a key exchange key, and wherein the determining that the first policy action entry is signed with the at least one authorization key includes determining that the first policy action entry is signed with the key exchange key.

11. The IHS of claim 8, wherein the at least one signatures database includes an allowed signatures database and a disallowed signatures data base, and w herein the determining that the first security violation has occurred includes:
determining that the second signature does not match the first signature in the allowed signatures database.

12. The IHS of claim 8, wherein the at least one signatures database includes an allowed signatures database and a disallowed signatures database, and wherein the determining that the first security violation has occurred includes:
determining that the second signature matches the first signature in the disallowed signatures database.

13. The IHS of claim 8, wherein the first policy action entry replaces the default policy action entry.

14. A method for providing a secure boot process, comprising:
receiving, by a Basic Input/Output System (BIOS), a first policy action entry for association with a first signature in at least one signatures database provided in a secured storage system, wherein the first signature is associated with a default policy action entry, and wherein the first policy action entry defines a first policy action to perform when a security violation is detected;

determining, by the BIOS, that the first policy action entry is signed with at least one authorization key that is stored in the secured storage system and, in response, associate the first policy action entry with the first signature in the at least one signatures database provided in the secured storage system such that the first policy action entry is stored with the first signature in the at least one signatures database;

generate, by the BIOS as part of a boot process and subsequent to the associating the first policy action entry with the first signature, a second signature;

comparing, by the BIOS, the second signature to the first signature and, in response, determining that a first security violation has occurred; and performing, by the BIOS in response to the determining that the first security violation has occurred, the first policy action defined by the first policy action entry.

15. The method of claim 14, further comprising:
receiving, by the BIOS, a second policy action entry for association with the first signature in the at least one signatures database provided in the secured storage system;

determining, by the BIOS, that the second policy action entry is signed with the at least one authorization key that is stored in the secured storage system and, in response, replace the first policy action entry associated with the first signature in the at least one signatures database provided in the secured storage system with the second policy action entry;

generating, by the BIOS as part of the boot process and subsequent to the associating the second policy action entry with the first signature, a third signature;

comparing, by the BIOS, the second signature to the first signature and, in response, determining that a second security violation has occurred; and performing, by the BIOS in response to the determining that the second security violation has occurred, a second policy action defined by the second policy action entry.

16. The method of claim 14, wherein the at least one authorization key includes a platform key and a key exchange key, and wherein the determining that the first policy action entry is signed with the at least one authorization key includes determining that the first policy action entry is signed with the key exchange key.

17. The method of claim 14, wherein the at least one signatures database includes an allowed signatures database and a disallowed signatures database, and wherein the determining that the first security violation has occurred includes:
determining, by the BIOS, that the second signature does not match the first signature in the allowed signatures database.

18. The method of claim 14, wherein the at least one signatures database includes an allowed signatures database and a disallowed signatures database, and wherein the determining that the first security violation has occurred includes:
determining, by the BIOS, that the second signature matches the first signature in the disallowed signatures database.

19. The method of claim 14, wherein the first policy action includes one of:
performing, through a network, at least one recovery action that is configured to remedy the first security violation; and securely erasing a storage device coupled to the BIOS.

20. The method of claim 14, wherein the first policy action entry replaces the default policy action entry.

* * * * *